Nov. 22, 1955     O. BROWN     2,724,642
METHOD OF ORNAMENTING WOOD PANEL AND RESULTING PRODUCT
Filed April 27, 1948     2 Sheets-Sheet 1

*INVENTOR.*

Nov. 22, 1955  O. BROWN  2,724,642
METHOD OF ORNAMENTING WOOD PANEL AND RESULTING PRODUCT
Filed April 27, 1948  2 Sheets-Sheet 2

INVENTOR.

United States Patent Office 2,724,642
Patented Nov. 22, 1955

2,724,642

METHOD OF ORNAMENTING WOOD PANEL AND RESULTING PRODUCT

Owen Brown, Los Angeles, Calif.

Application April 27, 1948, Serial No. 23,649

9 Claims. (Cl. 41—41)

My invention relates to the beautification of wood; more directly, however, to the embellishment of certain wood surfaces, at least one milling operation.

The invention is not applicable to woods indiscriminately. The best results have been had, thus far, with Douglas fir; but this is not to say that the method need be restricted to any one kind of wood since comparable, but variantly different, results have been produced with domestic ponderosa pine, southern cypress and west coast hemlock, to mention a few of the adaptable varieties.

While desirable specimens thereof have not been available for test purposes, it is believed the invention could be readily practiced with many foreign woods including that of the Japanese sugi tree, for instance, which last, according to published accounts, is the wood utilized for centuries in the making of sundry objects of utility and ornamentation by the so-called sugi process—"sugied" cypress representing the best known domestic application of this ancient Japanese craft.

On the other hand, the effects obtained on Douglas fir have been of such superior quality that it is doubtful if the same could be improved upon, or beneficially substituted, wherein large commercial production is contemplated.

*General distinguishments*

As the instant method bears some points of comparison to the sugi process, it may be explained that the latter comprises, in brief, the selection of a wood having an attractive and preferably a decidedly "lacy" hard and soft grain figure, charring the previously smoothed wood surface with a flame (as by means of a blow-torch in the domestic application of the art) whereby to corrode, carbonize, and soften the areas intermediary of the harder growth rings—the so-called hard grain—and, thence, removing only the charred, soft grain portions by the usual expedient of manually scraping the work with a wire brush.

The last named step not only produces a distinct high-low relief pattern but results in a contrasty effect as between the respective hard and soft grain areas.

Thereafter the wood may be colored to further enhance its optical appeal; but since its obviously burned and charred aspect is still so apparent, many admirers of sugied cypress, for instance, prefer the same in its rustic, uncolored state following a suitable waxing or the use of other means for protectively sealing the wood surface.

The process herein, however, while in some minor respects comparable to the sugi method, is actually in marked contrast therewith and eminently superior thereto. It is further notable as lending itself to the production of sundry important articles of manufacture, on a large commercial scale, while the oriental system has many inherent drawbacks in that respect.

The sugi process is dependent, wholly, upon the stepwise procedure wherein the wood surface is first charred and corroded. The method herein is not. According to my invention, it is quite unnecessary to char the wood, although, in the thermochemical treatment to be explained shortly, the wood surface may be briefly subjected to actual contact with a flame.

This step, however, is for the purpose of superinducing a certain chemical reaction or reactions which would not otherwise take place, and the result is usually almost instantaneous. The said contact, normally and preferably, is far too brief to result in the destructive charring of the surface grain, and such an eventuality, were it at all likely to occur, would be one to avoid rather than to attain.

Brushing, likewise, affords one preferred means for obtaining certain end results of the present invention; but these results are quite novel by comparison with those of the nearest related art, as will be further pointed out in due course. Indeed, the use of wire brushes, in itself, has been variously employed in connection with other processes which are more directly comparable to the sugi method, and wherein heat per se is utilized without benefit of thermochemic action.

For one typical example, Patent No. 2,113,679 to Wilhelm Cleff utilizes a heating element to automatically char ordinary wood boards, and a plurality of power-driven rotary wire brushes to automatically remove the carbonized softer grain. A recent Patent No. 2,431,148 to F. R. Stover, on the other hand, reverses the order of operational steps, in that it provides means and modes for initially wire-brushing a wood surface, whereby to scarify and roughen the soft grain preliminary to its subsequent "toasting" by a heating element. The declared object is to thereby merely more readily darken the soft wood areas, without particularly effecting the tone of the hard grain, and without having produced a charring action sufficiently heavy to necessitate removal of any carbonized surface wood.

It is possible, incidentally to thermochemically or otherwise pre-tone the surfaces of woods exemplified by Douglas fir plywood, and to thereafter produce thereon a more contrasty effect by lightly sand-blasting; that is, provided that a fine textured grit is employed at relatively low tank pressure and the blasting is not carried to the point at which the pre-toning of the hard grain will be seriously impaired.

In general, however, wherein the random grain pattern is particularly delicate—a frequent characteristic of certain firwood face-plies—the blasting is likely to disfigure some of the pre-toned hard-grain, or even to largely destroy attractive hair-line effects in the natural hard grain of the wood. Moreover, where formulas are used that are especially applicable to the thermochemic pre-toning of the hard grain of suitable woods, typified by the so-called hydrochloric treatment later explained, certain important values are likely to be lost by reason of the subsequent blasting.

In brief, said hydrochloric treatment, if not too heavily applied, produces initially an attractive blackish edging along one side only of the hard grain, the remainder thereof being an attractive amber or somewhat citron brownish tone; but the areas of hard grain wherein this edging first occurs appear to be softer than the rest thereof, since much or most of it is frequently worn away by the bombardment of the abradant.

If the pre-toning is carried to the point where substantially all of the hard grain has become blackened, the greater portion thereof may be retained—wherein all of the conditions are under adequate control—but this is accomplished at the sacrifice of the aforesaid desirable two-toning, and the delicate, lighter brown tones will have been changed to black or near black. (For further data concerning the aforesaid hydrochloric treatment and the thermochemic process in general, as applied to wood, reference should be had to my prior co-pending but since abandoned application entitled: "Thermatography: The Art of Synthetic Colorization, as Applied to Certain Thermochemically Sensitized Surfaces, Including Apparatus Therefor and the Resultant Products Thereof," Serial No. 630,889, now abandoned.)

I have discovered, however, that most or much of the aforesaid black edging in the relatively wide grain of average fir plywood panels, for instance, where the latter have been only moderately pre-toned by the hydrochloric formula, can be retained by substituting a relatively soft wire brush for the abradant action of a so-called sandblast. Furthermore, where the grain pattern is exceedingly delicate, with more hair-line traceries running here and there in the hard grain areas or wherein nearly all of the hard grain is so characterized, it is possible to remove an entire thin surface portion of the soft grain while retaining, in boldly emphasized relief, substantially all of the hard grain including clear-cut, jetty black, hairline effects which are frequently as narrow as 1/64 of an inch in width.

It may be said, however, that where the hard grain is quite narrow throughout, there is little point in trying to retain the aforesaid two-tone effect therein, and the most optically pleasing appearance, in such casses, is had by toning sufficiently to blacken all of the hard grain. It is best not to continue the heat treatment any longer than necessary, as hereafter further amplified.

Objectives: General and specific

While a number of distinctly novel results are accomplished by the augmented process, wherein a plurality of species is disclosed, it is by now clear that a major object hereof is to be able to first automatically obtain clear, distinct, thermochemic tones—preferably—in the milled hard grain surfaces of selected woods and to thence so remove a desirably thin surface component of the more or less incidentally darkened soft grain as to uniformly lighten up the latter and thereby to enhance the contrasty effect which is made possible in the pattern as a whole.

As intimated, it is also an object to obtain and retain such an effect regardless of whether, in the more delicate wood grain figures, the hard grain of suitable woods is to be rendered in black or near black tones or, in the more prevalent, bolder veined surfaces, portions thereof are to be merely thermochemically toned to characteristic brownish shades with distinct black edgings.

Another object is to obtain almost instantaneous thermochemic tones, as elsewhere explained, without having had to apply a heat treatment long enough to produce warping.

An especially important object is to produce pre-finished wood products, as aforesaid, wherein new and novel effects may be had in the form of surface banding, as more fully explained hereinafter.

Other objects will become apparent in connection with the descriptive data hereinafter, as complemented by the claims and the drawings, in which latter—

Fig. 1, a fragmental corner piece, typifies a product of the invention wherein the hard grain of the selected wood is of a particularly delicately figurated character;

Fig. 2, another fragmental corner area, further illustrates the method applicable especially to specimens having wider hard grain areas;

Fig. 3, a similar corner fragment, illustrates a banded article according to one method of imposing parallel stripes and the like, which same are pleasingly interrupted and rendered discontinuous by the irregularly disposed hard grain of the wood;

Figure 15A:
Figure 7:
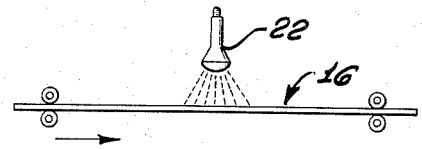
Fig. 7 represents a means for force-drying previously impregnated or coated plywood panels, as here exemplified by an infra-red light bulb.
Figure 9:
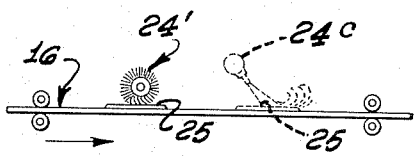
Figure 10:
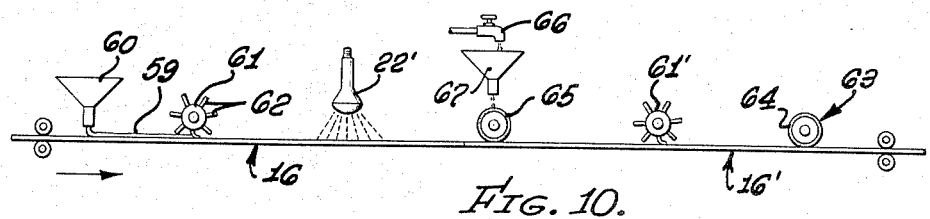
Figure 11:
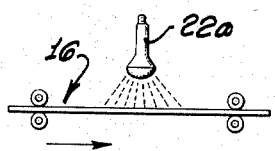
Figure 12:
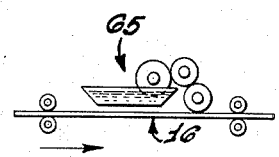
Figure 13:
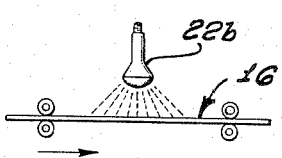
Figure 14:
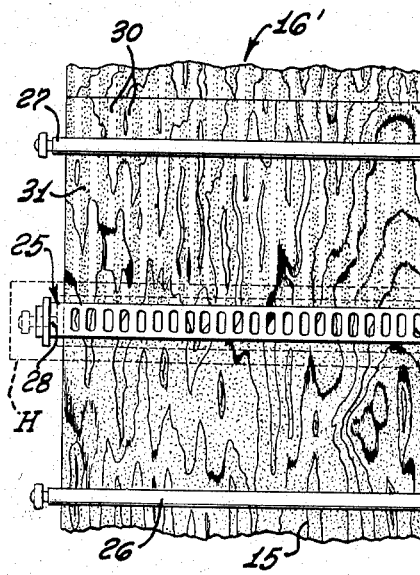
Figure 15:
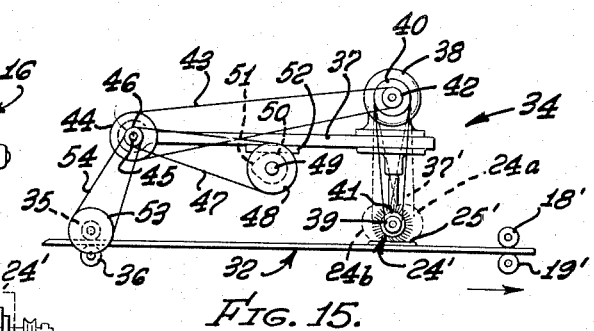

Fig. 9 indicates, in brief, automatic means for wire-brushing a previously treated plywood surface through a masking element;

Fig. 10 shows an entrained plurality of panel-treating apparatus, including: an applicator of surface coatings, a first squeegee roller, a drying element, a re-moistening device, a second squeegee roller or the like, and a rubbing roller;

Fig. 11 illustrates another heating device, similar to that of Fig. 7, for production lines which call for a secondary force-drying of the objects being processed;

Fig. 12 is a roller-coater or suitable other coating means according to the invention;

Fig. 13 is yet another heating device in the production line metnioned relative to Fig. 11;

Fig. 14 is a plan view, in part, of apparatus for wire-brushing wood surfaces which have been previously toned thermochemically: more especially, for brushing such surfaces through a masking means hereafter called "shield";

Fig. 15 is another specialty device required for carrying out at least one optional technique which may be employed in producing interrupted scarifications in the surfaces of plywood and the like. The schematic view is a side elevation;

And Fig. 15a is the abbreviated view, in side elevation, of an alternative scarfing tool, which may be substituted for the rotary-wire brush or brushes shown on the machine of Fig. 15.

Numerals and characters in the drawings, unless expressly indicated otherwise, relate to the same or to like features thereof throughout.

The further detailed process

As previously intimated, the wood products of the invention are usually pre-toned preliminary to a partial surface-removing treatment. And just as wire-brushing has, to date, been found to be one of certain preferred systems wherein it is desired to retain the maximum delicacy of grain figure, in a process of this general character, so will it also be desirable, barring the usual exceptions to a rule, to employ thermochemic toning means.

The main reason, perhaps, for utilizing thermochemic toners is the fact that wherein certain of these act more immediately and decidedly upon the hard grain, and initially to a lesser extent on the contiguous soft grain, it is possible to obtain strong and durable tones which deeply penetrate the said hard grain. Thus such tones are but little if any affected by a relatively moderate wire-brushing operation thereafter, the latter merely serving to impart a high polish to the hard grain while entirely removing a preferably not too deeply lacerated portion of the soft surface wood. The aforesaid hydrochloric formula is particularly applicable for this purpose.

Most other thermochemic toners—herein conveniently called activators—of the class which act initially upon the soft wood, will also darken and tone the hard grain if the toning process is carried sufficiently far; but, for reasons which need not be dwelt upon in detail, these latter toners or activators are not apparently preferred for the ends here sought. These, however, include an indefinitely long list of chemicals, characterized by solutions of copper sulphate (usually producing strong black on the whitish firwood soft grain), pearl ash for reddish tones, sodium sulphide for rich purplish dark browns, et cetera. The above brief list of activators is given only suggestively, since it may later be found possible to adapt the same to the colorizing of the hard grain without, coincidentally, rendering it more difficult to remove the toning incidentally imparted to the softer textured wood.

As a matter of convenience, aside from its desirability as a hard grain activator, the hydrochloric formula has been selected wherewith to explain the invention in some of its embodiments; but the same are, to be sure, but individual and readily variable expressions thereof. Likewise, Douglas fir plywood has been chosen as typifying wood surfaces which yield preferred results, since it would be unprofitable to describe, in detail, sundry other woods which may be treated to obtain generically comparable but endlessly variable effects.

One prime reason for the employment of fir plywood is the fact that practically all of the face-plies thereof are obtained by "unwinding" the logs from which such plies are removed. According to this unwinding or rotary-cutting process, as distinguished from the method of taking flat-cut veneers, there is a continuous effect of slash-graining throughout the individual face-plies. That is, instead of the grain figure being in the form of elongate and more closely spaced straight grain, characteristic of much board lumber, with less distinction between the hard and the soft grain areas, the rotary-cut plies present a variously involved, often closely, delicately barred or looped appearance. The general run of the mill, however, is not so closely figured and both the hard and the soft grain are displayed in relatively wider figurations.

Figure 1:
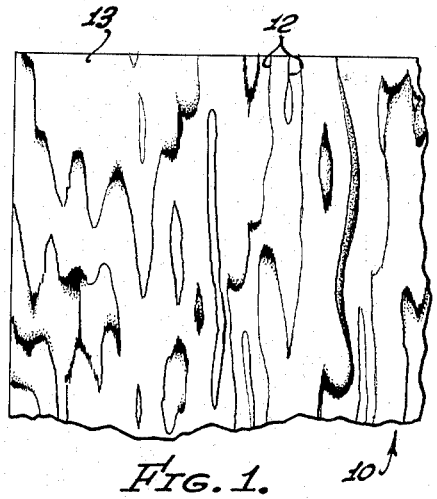
Figure 2:
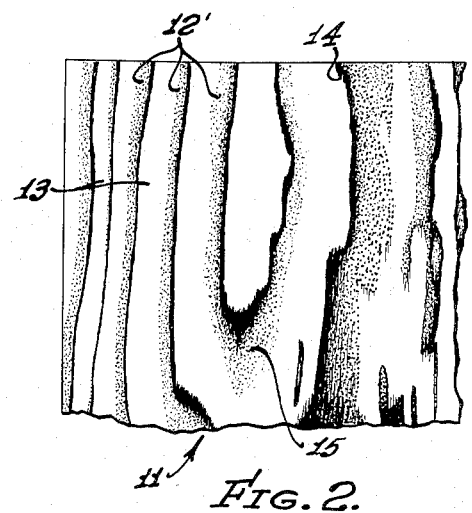

Thus some face-plies, after being treated according to the invention, will resemble the fragmental corner of the plywood panel 10 of Fig. 1, while others will be more broadly marked as seen on panel 11 in Fig. 2. It is obvious, then, that while at least two distinctly different results can be obtained, the same are not of different species and merely represent different inherent characteristics of the wood itself—whether taken from relatively young or the older slow-growth trees, for example. And such variant effects may be had by employment of the same formula in each case.

Suffice it to say that, according to one of the preceding objects, slab 10 is of the more narrowly veined or "lacy" grain figure, and while, as it appeared before both the thermochemic treatment and the brushing operation, some of the veining did not appear so delicate as here shown, the slab in question is an approximate facsimile of an actual panel segment and the jet black hairline striping, as at hard grain areas 12, represents the exposed surface areas wherein the hydrochloric activator took full effect. The contrasty appearance, of course, was heightened upon removal of substantially all of the intermediary soft surface wood, at areas 13, within the remainder of the face ply. The areas 13 have been left unshaded. In this state, the panel may, if desired, be given a coat of suitable clear sealer material.

Other details

As foretold earlier, slab 11 is particularly characterized by the broader hard grain 12', having the distinctive black edging 14, while the soft areas 13 are not different from the like portions of slab 10. And, as already explained, the areas 15 of the hard grain are of medium pale to darker brownish tones, some specimens being of approximately the shade called citron while others are more amber-like, depending largely upon the original color of the hard grain wood and/or the degree of toning applied.

In view of the co-pending art which has been cited, it would be superfluous to review the sundry possible techniques which may be employed to produce articles comparable to slabs 10 and 11. Briefly, however, typical processes will be described relative to the species seen in Figs. 3, 4 and 5 respectively. That is, while the partly processed slabs 10 and 11 could be utilized by arbitrarily omitting other procedures, the fully developed invention is resident in the aforesaid species wherein slabs 10, 11 and the like—before the brushing operation—are to be regarded as subject material which has been only partially processed.

The preliminary treatments, then, as approximately visualized in Figs. 1 and 2, will be given first with additional reference to Figs. 6 to 9 inclusive. Such operations are extremely simple ones; it being merely necessary to first impregnate one side—face-ply—of the hypothetical panel 16 with the selected hydrochloric activator, to be followed by the drying step depicted in Fig. 7, the heating step of Fig. 8, and thereafter a brushing operation as indicated by Fig. 9. It is again emphasized, however, that these operations may be only preliminary ones.

This applicant has followed a formula of mixing 1½ parts of muriatic acid, technical, to 5 or 6 parts of ordinary tap water, which is applied evenly over the surface to be toned. The resultant water white solution does not burn the bare hands, in the above named strength, but the breathing of hydrochloric fumes is to be avoided as much as possible and rubber gloves are, of course, recommended for the manual handling of liquid chemicals in general.

The panel 16, however, may be processed entirely within a suitable shield or shields, if desired; and since the operations contemplated herein are automatic, the same call for a theoretical minimum of manual handling. It is to be understood that the proportions given in the above formula were evolved entirely by applicant, and are subject to such variation as may hereafter be more expertly determined by qualified chemists. Indeed, comparable results may be had by either substantially increasing or decreasing the relative proportions of the water.

Figure 6:
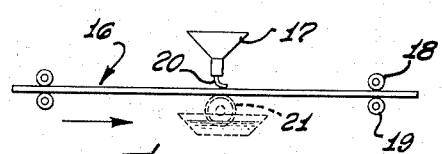
Fig. 6 is the schematic representation of means for chemically impregnating the face-ply of a plywood panel according to either of a duality of options to be explained (all of Figs. 6 to 13 are side elevational)

Fig. 6 discloses a duality of optional means for impregnating panel 16 from which a selection can be made. Thus the glass (preferred) hopper 17 is positioned athwart the path of panel 16 during the travel of the latter through upper and lower rollers 18 and 19. The transverse wick 20 is in contact with the upper surface of the moving panel and its successors and there is a constant transmission of the hydrochloric solution thereto from element 17.

Alternatively, automatic spray equipment (not shown) or the simplified one-roller coater therebelow may be used, the combination fountain-and-applicator roller having a sleeve 21 capable of constantly rewetting itself and of applying an adequate quantity of the activator to the underside of panel 16.

Figure 8:
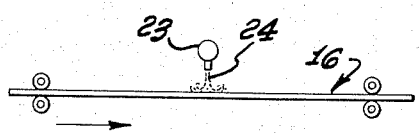
Fig. 8 is the schematic indication of the thermo-head of a so-called thermatograph, as later explained, used in the automatic thermochemic treatment of wood surfaces.

After passage through the drier of Fig. 7, or suitable other force-drying means, panel 16 may be fed immediately to a thermatograph, as indicated briefly by thermohead 23 of Fig. 8. On contact with the flame-barrier 24, the upper face-ply of the panel will be automatically, instantaneously, progressively heated; the blacks, browns and subsidiary tones appearing quite suddenly—suggestive of the action of a "peppy" photographic print in a so-called "peppy" developer.

On leaving element 23, panel 16 is immediately ready for the treatment wherein shallow portions thereof may be removed by brushing wheel 24' (or element 24ᶜ to be later described) of Fig. 9. However, in the extra-ornamented embodiments of Figs. 3 and 4 the said shallow surface portions are removed by operating wheel 24 through the masking or shielding device 25; thus insuring a more clear-cut pattern.

How banding is imposed

The shield 25 is more clearly seen in the plan view of Fig. 14, which element is mounted for close contact, preferably, with panel 16—panel 16' having already preceded it—but not such contact as would prevent the free movement of the panels under the action of feed roller or rollers 26, assisted by idlers 27. The mask or shield 25 may be constructed of any suitable material (see later comment) which will not be too readily worn out by the action of the wheel 24, and which latter is here schematically indicated to be, in reality, a series of small wheels (not individually depicted) placed side by side on the shaft 28, as by means of adapters, for example, whereby to comprise a substantially continuous rotary brush.

If desired, wherein the masking element 25 is not utilized, a plurality of spaced individual brushing wheels, front and rear, could be mounted in overlapping staggers, with complementary masking means for each staggered row thereof. It has been found that the delicacy of the pattern can be improved by utilizing a "leading" brushing element to remove a major portion of the surface soft grain, followed by a "follower" brushing element having much softer bristles and serving to clarify the work of said leading component.

Figure 3:
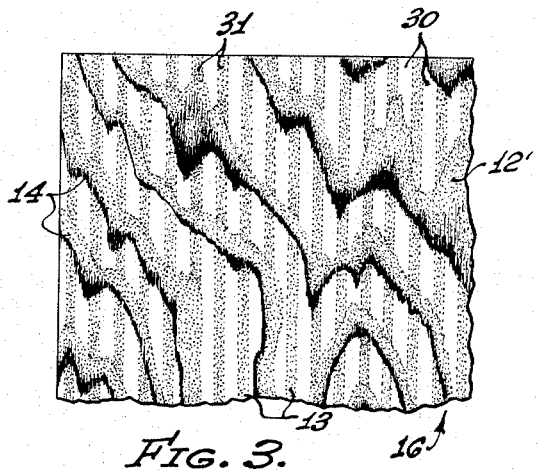

Shield 25 has the spaced perforations 29 through which the bristles of element 24 contact the surface of the panel; and since only the areas thereof which are exposed to the brushing element will be scarified, the panel will emerge on the frontal side of shield 25 marked by the much lighter toned bands 30; as see both Figs. 3 and 14. Areas 30 are, of course, interspaced by unbrushed intermediary banding 31; and inasmuch as the hard grain areas 12' are relatively impervious to the action of element 24', having comparatively soft bristles, the banding 30 and 31 is automatically and pleasingly interrupted thereby—thus producing an attractive pattern of formalized bands broken up by the informal, ever-changing and but slightly affected hard grain of the face-ply.

The irregularity of the general pattern is further desirably modified in that the hard grain 12' is of various widths and random veinings, no two face-plies being the same. A similar irregularity is to be noted on board stock, if selected for slash grain effects; hence a variably comparable result may also be obtained thereon, with only such minor adaptations in the apparatus as could now and henceforth be supplied to order by professionals of the related art.

In the hydrochloric treatment, it is obvious that panel 16 will be additionally accented by the black edging 14, if the hard grain areas are sufficiently wide to obtain such a two-toned effect therein, as was explained relative to Fig. 2. But if the pattern is more delicate, according to Fig. 1, wherein the hard grain is largely or entirely blackened, a variantly different but no less pleasing an effect may be had.

Sundry uses can be found for plywood panels, or portions thereof, after they have been processed in the manner disclosed herein. The invention is especially directed, however, to panels which may be used as decorative wall coverings; it being evident that exceptionally attractive walls can be constructed therewith at comparatively low cost.

*A plurality of types*

It is, as a rule, desirable to carry out a unified decorative scheme in different rooms of the same dwelling. But most home owners are averse to having all of the wall treatments exactly alike. Consequently, it is provided that in addition to the species shown in Fig. 3 (which may be further embellished by other treatments to be described), plywood panels comparable to panel 16 may be produced according to the modified designs of Figs. 4 and 5, which indicate two additional possibilities.

Figure 4:
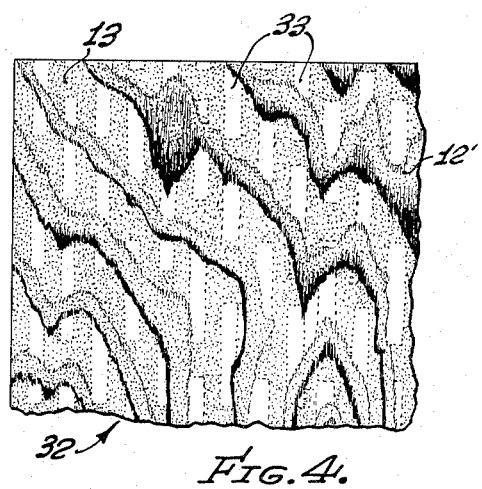
Fig. 4 is comparable to Fig. 3 wherein the stripes are replaced by only broken segments thereof in spaced relations, and wherein said segments are again interrupted and broken by the hard wood grain.

Relative to Fig. 4, it is apparent that panel 32 is mainly distinguished from panel 16 in that instead of the scarified bands 30—see Fig. 3—being interrupted only by the hard grain 12', such bands are here additionally broken up into the segments 33 of predetermined lengths individually, and, to be sure, of any desired width. In fact, it is obvious that either of elements 30 or 33 could be variously modified—as by having some of them narrow and others wide, or more widely spaced for instance—and the patterns shown merely indicate the general mode of treatment. If desired, some of these scarified areas could be in the form of elements 30 interspaced with others thereof according to segments 33.

Segments 33, of course, are only of full length where imposed entirely within the soft grain areas 13 and would not be present in especially wide areas of hard grain 12', or such grain of lesser width where it runs vertically with the general grain trend. The result is a pleasing variation from the banded effect of Fig. 3, whereby one such pattern may be used to complement another in different rooms of the same building interior; or such panels, inclusive of the embodiment of Fig. 5 to be detailed shortly, may be utilized in the same room—one type for the field and the other for dado and/or wainscote.

(Incidentally since this applicant has, in a subsequently entered and presently copending application bearing Serial No. 33,246 of June 16, 1948, called "Variegated Wood Products, Including Means and Methods Relating Thereto," disclosed both apparatus and methods for producing articles of manufacture comparable in certain respects to such as are described herein, it should be pointed out that the articles of the copending case are specifically distinct since expressly comprised of panels and the like where the grooving is, in each of the species there shown, diametrically contrary to the general grain trend of such articles.)

In order to produce elements 33, it is necessary to have the brushing wheel or wheels touch the previously toned surface of panel 32 at only the required areas. It is elementary that at least two general arrangements are possible whereby to obtain such a result. A less preferred way, for example, is to provide a properly perforated mask or shield (which may be similar to member 25 of Fig. 14, but of the required more multiplex character) to cover the entire area of the panel to be scarified. The brushing component 24 could then move, according to any suitable power-driven carriage means, from one end of the shield to the other while simultaneously entering each and all of the slots similar to perforations 29 and thus also into interrupted contact with the panel; or the thus partly shielded panel could be moved relative to the scarifying component.

A more preferred method, however, is made possible by the auxiliary unit called scarifier 34 of Fig. 15.

In the drawing panel 32 has been received between the feed roller 35 and idler 36, in association with upper holddown and lower supporting rollers 18' and 19'. The so-called scarifier is conveniently comprised of a tippable arm or table 37, upon which is carried the motor 38 and from which arm or the like appends the lower shaft member or members 39, having the brushing wheel or wheels 24'. Wheel or wheels 24', in common with the like element 24' of Figs. 9 and 14, is assumed to provide an adequate coverage across the width of the panel and may comprise a substantially continuous brushing surface made up with individual rotary brushes or, alternately, spaced individual brushes mounted in suitably staggered pluralities, for illustration.

A single row of brushes, as generally indicated by continuous black lines in Fig. 15, will of course produce only unstaggered markings. But a staggered pattern calls for but a minor further modification, as will be explained directly. Shield 25' is self-explanatory in view of the similar component of Figs. 9 and 14. The motor 38 is operated to intermittently lower and raise the brushing head—element 24'—into and out of contact with the face-ply of panel 32 through suitable spaced openings in the shield 25'; and this is accomplished quite simply by means of the arrangement of pulleys and belting as shown.

Thus the large pulley 40 of motor 30 has a loop of belting trained thereon and carried therefrom to the small pulley 41, which rotates shaft 39 of the brushing element. Motor 38, however, also has the small pulley 42, from which the belt 43 is carried to the large pulley 44 adjacent the fixed pivot 45. And carried on the same shaft with pulley 44 is the small pulley 46 which is entrained by belting 47 to the larger pulley 48. This latter pulley is carried on the fixed supporting shaft 49 and is co-rotatably associated with a suitably configured cam 50 having the face portion 51.

The portion 51, of course, upon intermittent contact with the cam-plate 52, causes the entire arm or table 37 to be lifted slightly; and this action briefly, automatically lifts element 24' from shield 25', and to which it automatically returns into contact with the also automatically moved panel 32 at each revolution of cam 50. Obviously the larger the diameter of the cam the longer will be the markings 33.

The movement of the panel is produced by the automatic action of feed-roller 35 because of its synchronization, through pulley 53 and belt 54, with the remainder of the power train. Obviously, then, with the motor shaft turning quite rapidly, element 24' can be rotated at high speed whereas, by reason of the differential gearing as here very generally shown, the respective movements of the panel 32 and cam 50 may be as slow as desired.

Moreover, it is apparent that as the cam turns so moves the panel 32 in coordination therewith; so that whatever the speed of the panel, the member 37 and appendant element 24' will operate in unison to produce exactly the same pattern of markings 33.

In Fig. 4, however, elements 33 are staggered as shown; and in order to produce such a pattern it is merely necessary to provide a duality of brushing components slightly offset from one another, as briefly, suggestively indicated by right and left phantom rotary brushes 24ª and 24ᵇ which are here carried from a Y-member 37' forking into suitable shafting on which the right and left brushes are rotatably carried. Each of the brushing components can be separately driven by means of individual V-belts or the like, as shown, in substantially the same manner as was mentioned relative to a single brushing wheel assembly 24'.

Other options

Figure 5:
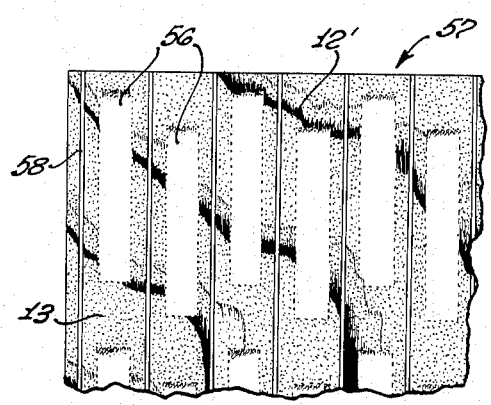
Fig. 5 is similar to Fig. 4 but distinguished in that the aforesaid spaced segments are differently imposed, whereby to cut through both the soft and the hard grain, and wherein yet other striae, cutting through hard and soft grain alike, additionally accent the unscarified areas of the wood surface.

Some purchasers will doubtless prefer a more pronounced pattern of interrupted markings; in short, such as will each be fully continuous without reference to the hard grain 12'; as see Fig. 5. This variant is produced by the simple expedient of removing the brushing element 24' of Fig. 15 and replacing it with a modified form of marking tool: in short, the kerfing-head 55 of Fig. 15ª. When element 55 is used, the mask 25 will not be required.

Said kerfing-head is here conveniently presumed to be a multiple-dado-head, with properly spaced blading components, whereby the markings 56 of Fig. 5 may be very shallowly cut; and it also is assumed that wherein the markings 56 are to be partially or fully staggered, respective forward and rearward rows of the individual cutting devices will be carried in accord with the previously described right and left brushing elements 24ª and 24ᵇ of Fig. 15.

Furthermore, in the marking of panel 57, whereby to produce the unbroken decorations 56, it is not entirely essential that a dado or rotary-saw type of tool be employed, since the same may be substituted by a multiplex head of sanding, emery or carborundum wheels for example.

The intermediary striae 58 are optional and could be produced by a separate run of panel 57, as through a planer having suitably serrated blades; and it would be normally preferred to impose such striae before thermochemically toning the panel, whereby to produce round-cornered grooving. Alternatively, however, an auxiliary rotary cutting tool (not shown) could make the multiplicity of cuts 58 at the time that panel 57 was being subjected to the action of element 55 or its substantial equivalent. Such a cutting tool could merely have a spaced row of ordinary well sharpened rotary saw blades, mounted to shallowly engage the upper face-ply.

Relative again to the power train of Fig. 15, it is apparent that pulleys 44, 48 and 53 could be variable-speed pulleys, such as the well-known Reeves type, for example; so that no other form of speed regulator would be required. And with regard to the apparatus of Fig. 14, it is sufficiently obvious that the brushing element 24' is driven by its own motor M24, while panel 16 is here indicated to be separately moved by the feed roller 26 and the latter preferably driven by a different motor (not shown) via belting 26'.

The phantom figure H indicates a hood within which the brushing operation takes place; it being assumed that the resultant particles of comminuted wood fibers which are torn out by element 24 will be confined within said hood and carried off through a suitable suction pipe, as is customary on installations of a comparable description.

As was intimated previously, each of the panels 16, 32 and 57 may be utilized without further embellishment, thus affording somewhat more naturalistic wood effects. According to my full stepwise procedures, however, such panels are further treated and chromatically toned according to any of sundry well known and appropriate means of applying coloring matter to decorative wood surfaces. Thus the panels could be treated with water stains, with water or alcohol-soluble aniline dies, with oil stains, chemical stains, heavy pigmented coloring materials along with a subsequent wipe-off operation, and so on.

One preferred method is to utilize water-dispersible pigment colors, with the aid of which the panels may be further toned in attractive pastel shades; more particularly, that is, in the respective areas 30, 33 and 56 but considerably also in the unmarked soft grain 13, as modified by the pre-toning of the same. According to this option, and after the treatment by either of elements 24' or 55 or their variables, the panels can be immediately subjected to the apparatus of Fig. 10, and inclusive of Figs. 11, 12 and 13.

For a simple illustration, it will be assumed that the panel being processed is panel 16, which, in Fig. 10, is shown preceded by a like panel 16'. Briefly, panel 16 first receives a sufficient coating of the toning agent 59, called filler, which can be supplied from hopper 60 or other suitable device. For example, a roller-coater could be utilized instead. The filler material may be of either light or heavy consistency, depending upon which of a plurality of possible effects are sought, and it should completely overcoat the panel from side to side. Watery mixtures with selected dry pigment colors are preferred. As soon as the coated areas of panel 16 encounter the squeegee device 61, which is preferably rotatable, the yieldable flippers or vanes 62 will operate to wipe excess filler material from the continually emerging upper side of panel 16 but leaving a substantial component thereof firmly anchored in the more open soft wood grain.

Certain options are possible in the further treatment of the panel.

Filler techniques

For instance, according to the hydrochloric formula, which was selected herein as typical of possible thermochemic treatments, the aforesaid black edging in the moderately toned hard grain 14 will withstand a considerable amount of wire brushing; but as soon as any watery solution is applied to the surface of the panel, a substantial portion of the jetty blacks will dissolve out— as though by leaching—leaving merely brownish tones shading to blackish only in the more heavily toned areas. In some instances, this reduction of the blacks may be desirable in accord with the complementary positive colorizer (filler) to be applied. At other times, however, it is desirable to retain all of the blacks for a maximum contrasty effect.

While non water dispersible fillers may be employed, the more preferred method, as foretold, is to employ simple mixtures of ordinary standard dry colors—the type used in coloring calsomine paints. Obviously a final sealing top coat will be applied later.

In the course of the squeegee treatment, the greater portion of the filler mixture deposited on the surface of the wood grain will be removed, leaving only the pastelized effect of the same where desirably imbedded in the pores of the wood. And the thus treated surface will be further clarified (except in areas 30, 33 or 56) when also dried and subjected, by preference, to the action of the rubbing roller 63; the latter having a coating of felt or the like 64.

By utilizing the moistened rubbing roller 65, which is continuously wetted from hydrant 66 via hopper 67, it is possible to quickly soften up the more tenacious portions of the filler still clouding the hard grain without materially disturbing the same within the lower areas 30, 33 or 56, or even in the higher areas 13, which last will retain an adequate portion of the pigment to present a pastel appearance.

By thence quickly again squeegeeing the panel with the aid of an element 61', the hard grain can be sufficiently cleared of any remaining cloudy film thereon; this treatment being further enhanced by subjecting the panel to the action of the dry rubbing roller 63.

Before finally sealing such panels, it is important that they shall be more than merely surface dry. Hence they may pass at once from element 63 to the drying element 22$^a$ preliminary to the application of a sealing top coat, as by means of the roller-coater 65, followed by a final force-drying by element 22$^b$ or its equivalent.

Sundry color effects may be produced, these being limited only by good taste and aesthetic judgment. Thus, in some instances, a desirable additive color could be an Indian yellow, produced from a mixture of ferrite yellow with water and white pigment as desired. For white, any of sundry low cost dry pigments of good hiding quality can be used, as, for instance, titanium oxide. A good silver grey may be obtained by mixing titanium white with drop black or other blackish coloring agent, together with the required amount of tap water. Some operatives may also prefer adding thereto an elected proportion of aluminum powders, yelding so-called "casket greys." Mixtures of white dry pigment with water and so-called "microfilm" commercial ink (substituting for well known solutions of tannic acid and sulphate of iron) will produce greys having a lavender cast. Sundry other effects are optional and will occur to operators who are conversant with such matters.

Incidentally, wherein wood surfaces are to be processed according to either of Figs. 3, 4 or 5 but where simple toning agents are to be utilized rather than thermochemic activators, the same may be selected from a wide range of dye stains and/or positive chemical colorizers. If chemical colorizers are employed, it is preferable to use those which react with the wood to impart tones therein—especially in the hard grain—which can also be treated for desirable pastel effects. And for such a purpose, dry pigment white, for instance, such as titanium white or the like, can usually be premixed with the toning agent to save an operation. Typical of positive chemical colorizers may be mentioned solutions of chromic acid and potassium permanganate for brownish tones which same have long been used as positive wood stains.

Referring again to the perforated shield 25, it is preferable, although not graphically shown in the small drawing, that the openings 29 shall be formed in a separate grid; which latter can be removed from the remainder of the shield and replaced as often as necessary. Applicant's model utilizes a grid comprised of a plurality of suitably spaced individual lengths of stiff but very thin clock-spring steel, which same is quite tough and wear-resistant.

Other details

In this connection, the brushing element 24' of Fig. 9 has been featured as one preferred, simple, and very economical means of abrasively treating the wood surfaces described. I do not, however, wish to limit the method herein to the use of said brushing device, wherein an abrading action is desired through the grid openings 29, for example, since professionals of the related arts will readily understand that a comparable result may hereafter be had by a mere substitution of equivalents. To cite one specific alternative, the multiple blasting-head 24$^c$, as mentioned earlier, could be employed in combination with standard auxiliary equipment therefor which is well known and is not, therefore, additionally shown in the drawing.

Blasting-head 24$^c$ is assumed to comprise a plurality of individual nozzles, and, if used in lieu of wheel 24', it is preferable to employ very fine grain carborundum or other suitable grit—such as 85 to 100 mesh—and relatively low tank-pressure. Element 24$^c$ may be utilized with the shield 25, and, in that case, it is especially desirous that replaceable grids be used on account of the severe abrasive action of the gritty particles. Long-lasting grids may be constructed from the metal known commercially as "carboloid."

Wherein brushing wheel 24' is used, it is important that the wire bristles shall be of the proper stiffness, as can be readily professionally determined; and in order that such bristles may contact the wood surface without applying an undesirable amount of pressure, the individual ribs of the grid are preferably beveled on both sides. However, if standard lock spring steel, for example, is used in the construction of the grids, and if the same are sufficiently thin, beveling will not be necessary. If the individual strips of the grid material—such as lock spring steel—are too thick, and are placed too closely together, the brushing wheel bristles may not enter therebetween sufficiently to produce a desirably clear-cut effect. The natural tendency, in that event, is to change to a stiffer wire brushing component; but this will have a harsher effect upon both hard and soft grain alike.

The preferred arrangement, as aforesaid, is to use very thin grid bars, which allow relatively soft bristled brushes to be used, which same will not be prevented from brushing closely alongside each of said grid bars without having to apply excessive pressure. If desired, metal as thin as approximately 1/64-inch clock-spring steel may be employed.

Certain components of the invention, while mutually contributory to the results herein described, may, quite obviously, have other uses. Thus the so-called scarifier of Fig. 15, especially when utilized with the kerfing-head of Fig. 15$^a$, could be employed in other processes for similarly marking the surfaces of wood boards, face-plies to be differently treated, and so on.

While panel 57, in order to avoid undue complexity in the drawings, is seen to have only single striations 58 between the individual, longitudinally disposed markings 56 or the like, it is obvious that a plurality of such—or of differently formed—striae may be so imposed; and/or a plurality of the longitudinally disposed markings 56, staggered or otherwise, may be interposed between each of at least singly disposed longitudinal striations.

The markings 56 need not be all of the same length or width (a mere matter of cams and mountings), and said striae 58 could be of various configurations whereby, for one example, to present a closely spaced pattern similar to well known "combed" plywood but with intermediary, relatively closely spaced markings 56 between certain of the same: thereby producing a so-called grain-destroying composite pattern wherein neither the grain figure itself nor occasional patches would be visible except upon close inspection.

Alternatively, however, either or both of elements 56 and 58 could be so spaced from one another as to leave considerable areas of the natural wood grain therebetween, and these areas could, by option, and in either case, be variously further treated: as, for example, thermochemically.

Needless to say, a similar latitude relative to elements 56 and 58 is reserved for each of the species depicted in Figs. 3 and 4 except as to presently unknown limitations, if any, of the prior art. Thus, while not actually shown therein, it will be clearly but a matter of election, hereafter, as to whether striations 58 or the like are to be included in said Figs. 3 and/or Fig. 4 views.

Since, in common with my concurrent and prior co-pending disclosures, I have submitted subject matter believed to be of pioneer character with respect to the closest known art, the hereafter appended claims should be construed accordingly; and, in no event, solely upon the basis of the merely illustrative embodiments shown and described. Such claims, as and if suitably amended, are believed allowable in substance as follows.

I claim:

1. As a new article of manufacture: a plywood panel having a face-ply of the rotary-cut type, and said ply normally characterized by overlapping growth layers of relatively hard and relatively soft grain surface and subsurface wood structure in randomly disposed figurations; the outermost surface wood presenting a distinctly shaded synthetic tone-pattern of relatively light and relatively darker contrasty effects contributed by the respective soft and hard textured figurations, but broken up and further accented by a plurality of shallow, substantially geometrically parallel recesses running in the direction of the general grain trend and lengthwise of the longitudinal dimension of said panel; each of said recesses—except where frequently partially deformed by encroaching hard grain—being of substantially the same width for each segmental length thereof, but all thereof being of an irregularly discontinuous formation in that they are present only in the soft textured wood, and are locally interrupted and stopped by and at each fully intersecting figuration of hard grain wood wherever the latter describes its normally irregular pattern of veining athwart the substantially straight contour lines of said parallel recesses.

2. As a new article of manufacture: a wood object having a substantially flat surface portion, as to its outermost contour lines, and said portion characterized by randomly disposed hard and soft grain figurations; the surface wood generally presenting a natural grain pattern broken up and accented by a plurality of shallow, substantially precisely—but unsymmetrically—parallel zones of distinctly recessed wood structure, defined by a complementary plurality of intermediary ridges of the outermost soft grain wood, running in the same direction as the normal grain trend of said object; each of said recessed zones being, within its own particular confines, of substantially the same width with respect to said intermediary ridges, wherever the latter are irregularly present on respective parallel sides thereof, but all of the recessed zones being of a discontinuous formation in that they are present only in the soft textured wood and are locally irregularly interrupted and stopped by and at each intersecting figuration of hard grain wood wherever the latter describes its pattern of random veining athwart the substantially geometrically straight contour lines of both the said recessed zones and said intermediary ridges.

3. As a new article of manufacture: a wood product having a random grain figure characterized by respectively distinct hard and soft grain portions, certain of said soft grain portions being on a substantially common plane with the outermost surface hard grain, and certain other soft grain portions comprising the side and bottom walls of shallow, spaced zones of distinctly recessed wood structure defined by a complementary plurality of intermediary ridges of the outermost soft grain wood; said recessed zones, per se, being disposed in substantially geometrically straight parallel rows—except where unsymmetrically deformed, in part, by encroaching hard grain—with substantially vertical sides, and each such recessed zone being, within its own confines, of substantially the same width with respect to the closest of said intermediary ridges, wherever the latter are irregularly present on respective parallel sides thereof, but all thereof being of a discontinuous conformation in that they are present only within the soft textured wood and are frequently irregularly interrupted and stopped by and at each intersecting figuration of hard grain wood where the latter describes its pattern of random veining athwart the substantially geometrically straight contour lines of both the said recessed zones and said intermediary ridges; the latter bearing a deposit of synthetic coloring matter, especially in the soft grain portions thereof, which renders them distinctly accented by contact with said bottoms of the recessed zones, and both said ridges and said recesses running directly with the general grain trend of said product.

4. As a new article of manufacture: a wood product characterized by distinctly variant hard and soft grain surface figurations, and characterized further by a plurality of discontinuous shallow recesses running in substantially geometrically straight, substantially geometrically parallel rows through the soft textured wood; said recesses being present only in said soft textured grain portions and, therefore, frequently unsymmetrically interrupted and deformed where—but only where—intercepted and/or entirely crossed by the normally irregularly disposed figurations of the hard grain surface wood.

5. As a new article of manufacture: a laminated product having a wood face-ply characterized by distinctly variant hard and soft grain surface figurations, and characterized further by a plurality of discontinuous shallow recesses running in substantially geometrically straight, substantially geometrically parallel rows in the direction of the general grain trend of said face-ply; said recesses being present only in the soft textured grain portions and, therefore, frequently unsymmetrically interrupted and deformed locally where—but only where—intercepted and/or entirely crossed by the normally irregularly disposed figurations of the hard grain surface wood.

6. The method of imparting respectively distinct but intercooperative forms or ornamentation to the selected surface of a wood wall panel member which includes: impregnating said surface with at least one heat sensitive toning substance of liquid consistency; drying the surface; heating it sufficiently to produce thermochemically induced tones therein, of an elected intensity; stationarily mounting a multiplex masking device to extend entirely transversely of the path of intended travel of said surface, and so as to enable the latter to subsequently move adjacent a spaced multiplicity of the individually disposed masking elements, while progressively moved transverse segments of the surface are thereby allowed to travel in unmasked relations with respect thereto; moving said surface relative to the masking device, and adjacent one side thereof, in such manner that the panel travels endwise of its longest dimension in the same direction as the grain trend of the surface wood structure; and simultaneously abrading only the recurrently unmasked portions of said surface through the openings between said individually disposed masking means; this latter step including the formation of a spaced plurality of substantially geometrically straight, substantially geometrically parallel grooves in the surface soft textured wood, only, from one end of said panel to the other running in the direction of the general grain trend, as well as a complementary plurality of intermediary ridge portions, which grooves and ridges are thus enabled—in cooperation with the previously imparted thermochemic tonal pattern—to produce a plurally accented surface effect.

7. The method of plurally ornamenting a selected wood surface, so that one type of the ornamentation augments and complements the other, which includes: impregnating said surface with a solution containing a chemical substance of known latent tone-imparting property with respect thereto in the presence of adequate heat; drying and heating said surface sufficiently to develop thermochemically induced tones therein of an elected intensity; and, thereafter, moving said surface relative to, and in close proximity to, one side of a masking device while simultaneously brushing out progressively exposed portions of the surface wood through the openings of the masking means, as each locally unmasked segment of said surface passes adjacent said device; this last step including the formation of a spaced plurality of substantially geometrically straight, substantially geometrically parallel grooves in the surface soft textured wood, only, as well as a complementary plurality of intermediary ridge portions, which grooves and ridges are thus enabled, in cooperation with the previously imparted synthetic tonal pattern, to produce a plurally accented surface effect.

8. The method of producing a multiplicity of spaced ornamental bands in a selected wood surface which comprises: toning said surface in distinct contrast to the tonal effect of the natural wood grain structure which is directly contiguously below the toned outermost segment thereof; moving the surface at a known rate of travel relative to and in close proximity to a masking element; and abrading progressively exposed portions of said surface through the openings of the masking means as each locally unmasked segment of the surface wood passes adjacent said masking element; this latter step including the removal of numerous elongate, substantially, geometrically straight, substantially geometrically parallel strips of the toned surface soft textured wood only—and except where interrupted and deformed by irregularly intercepting hard grain portions—at areas thereof contacted by the abrading means, to a depth sufficient to expose subsurface lengths of the underlying wood structure in accenting contrast with the directly adjacent unremoved zones of said previously toned surface wood.

9. One preferred method of processing a laminated product according to the article of claim 5 which includes: pretoning said face-ply of said product; moving the thus toned face-ply relative to and in direct contact with one side of a masking element; and intermittently moving an abrading device into contact with said face-ply through the openings of the masking means, while each locally unmasked segment of the face-ply surface passes adjacent said masking element; this last step including the removal of a sufficient component of the previously toned surface wood, at only particularly spaced areas thereof running in broken but substantially geometrically straight rows thereof, to break up the prior continuity of said surface wood while imparting thereto a form of high-low effect serving to plurally accent said article.

References Cited in the file of this patent

UNITED STATES PATENTS

| | | |
|---|---|---|
| 325,351 | Mankey | Sept. 1, 1885 |
| 361,687 | Gardner | Apr. 26, 1887 |
| 501,668 | Shannon | July 18, 1893 |
| 649,978 | Buyten | May 22, 1900 |
| 749,004 | Wadamori | Jan. 5, 1904 |
| 1,180,516 | McIndoe | Apr. 25, 1916 |
| 1,302,344 | Fenton | Apr. 29, 1919 |
| 1,431,917 | Antaramian | Oct. 17, 1922 |
| 1,628,918 | Schmid | May 17, 1927 |
| 1,633,563 | Abbott | June 28, 1927 |
| 1,758,336 | Schmid | May 13, 1930 |
| 2,050,118 | Pearson | Aug. 4, 1936 |
| 2,075,925 | Baldwin | Apr. 6, 1937 |
| 2,167,813 | Plantrou | Aug. 1, 1939 |
| 2,286,068 | Deskey | June 9, 1942 |
| 2,292,996 | Helgeson | Aug. 11, 1942 |
| 2,297,393 | Strang | Sept. 29, 1942 |
| 2,345,942 | Lehman | Apr. 4, 1944 |
| 2,388,880 | Stitt | Nov. 13, 1945 |
| 2,431,148 | Stover | Nov. 18, 1947 |
| 2,450,401 | Thompson | Sept. 28, 1948 |
| 2,467,194 | Dewitt | Apr. 12, 1949 |
| 2,483,584 | Lesavoy | Oct. 4, 1949 |
| 2,520,222 | Stone | Aug. 29, 1950 |

OTHER REFERENCES

Berlinger; Urea Treatment of Lumber, March issue of Mechanical Engineering, pp. 181–186.

Vanderwalker; Wood Finishing, publ. by Drake, 1944, pp. 145–152.